(12) United States Patent
DeVries

(10) Patent No.: US 6,975,849 B1
(45) Date of Patent: Dec. 13, 2005

(54) METHOD FOR CUSTOMIZING A CAR RADIO TO INDIVIDUAL REQUIREMENTS

(75) Inventor: Claus DeVries, Edemissen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,548

(22) PCT Filed: Apr. 8, 2000

(86) PCT No.: PCT/DE00/01088

§ 371 (c)(1),
(2), (4) Date: Mar. 22, 2002

(87) PCT Pub. No.: WO00/72276

PCT Pub. Date: Nov. 30, 2000

(30) Foreign Application Priority Data

May 21, 1999 (DE) ................................ 199 33 192

(51) Int. Cl.[7] ................................................ H04B 1/06
(52) U.S. Cl. ...................... 455/344; 455/345; 455/557; 455/351; 705/26
(58) Field of Search ................................ 455/344, 345, 455/349, 346, 347, 348, 351, 557, 558; 379/88.21; 235/492, 380; 381/314; 705/26, 67, 27

(56) References Cited

U.S. PATENT DOCUMENTS

| 5,036,461 | A |   | 7/1991 | Elliott |   |
|---|---|---|---|---|---|
| 5,384,834 | A | * | 1/1995 | Sato et al. | 379/88.21 |
| 5,404,580 | A | * | 4/1995 | Simpson et al. | 455/558 |
| 5,448,765 | A | * | 9/1995 | Kovanen et al. | 455/558 |
| 5,630,159 | A | * | 5/1997 | Zancho | 455/558 |
| 5,664,228 | A | * | 9/1997 | Mital | 235/492 |
| 5,940,805 | A | * | 8/1999 | Kopp | 705/26 |
| 5,984,181 | A | * | 11/1999 | Kreft | 235/380 |
| 6,161,130 | A | * | 12/2000 | Horvitz et al. | 709/206 |
| 6,216,227 | B1 | * | 4/2001 | Goldstein et al. | 705/67 |
| 6,311,241 | B1 | * | 10/2001 | Hofmann | 455/558 |
| 6,377,160 | B1 | * | 4/2002 | Groeger | 455/344 |
| 6,400,958 | B1 | * | 6/2002 | Isomursu et al. | 455/557 |
| 6,424,722 | B1 | * | 7/2002 | Hagen et al. | 381/314 |
| 6,647,251 | B1 | * | 11/2003 | Siegle et al. | 455/345 |
| 6,704,774 | B2 | * | 3/2004 | Terranova | 705/27 |

FOREIGN PATENT DOCUMENTS

| DE | 44 45 847 |   | 6/1996 |   |
|---|---|---|---|---|
| DE | 196 32 197 |   | 2/1998 |   |
| DE | 19632197 | * | 2/1998 | ............. H04L 9/32 |
| EP | 0 640 899 |   | 3/1995 |   |
| EP | 640899 | * | 3/1995 | ......... G05B 19/042 |
| EP | 0 530 601 |   | 3/1998 |   |
| JP | 10-255192 | * | 9/1998 | ............ G08G 1/00 |
| WO | 91 12698 |   | 8/1991 |   |
| WO | 98 09257 |   | 3/1998 |   |
| WO | 98 52160 |   | 11/1998 |   |

* cited by examiner

Primary Examiner—Lana Le
(74) Attorney, Agent, or Firm—Kenyon & Kenyon

(57) ABSTRACT

A method of customer-individualized adjustment of a car radio having a microprocessor control and corresponding internal operating software, an interface for changing the operating software and an external memory device that can be read by the interface being provided. A selection is made from various software modules for different functions of the car radio, this selection is stored on the memory device, the memory device is connected to the interface in order to start operation of the car radio, and the software modules stored on the memory device are loaded into the car radio as an extension of the operating software.

4 Claims, No Drawings

METHOD FOR CUSTOMIZING A CAR RADIO TO INDIVIDUAL REQUIREMENTS

FIELD OF THE INVENTION

The present invention relates to a method of customer-individualized adjustment of a car radio having a microprocessor control and corresponding internal operating software, an interface for changing the operating software and an external memory device that can be read by the interface being provided.

BACKGROUND INFORMATION

German Patent Application No. 196 32 197 describes a method of programming electric appliances, making it easy to change internal software by using chip cards. The chip card provided for this purpose has a memory unit. The device itself has a loading routine stored in a memory in the device for programming by chip card.

SUMMARY OF THE INVENTION

An object of the present invention is to improve upon a car radio of the type described above, so that the scope of its functions can be changed easily according to the wishes of the customer.

For this purpose, it is provided according to the present invention that a selection is made from various software modules for different functions of the car radio; this selection is stored on the memory device; the memory device is connected to the interface in order to start operation of the car radio, and the software modules stored on the memory device are loaded into the car radio as an extension of the operating software.

This has the advantage that the scope of functions of the car radio can be changed easily by adding suitable software components, so that an end user can acquire an inexpensive basic unit having only the functions desired by that end user, and then later after financial expenditures distributed accordingly over a period of time, the functional versatility of the basic unit can be expanded. Therefore, at the initial acquisition of the basic unit, the end user need not pay for functions that are neither desired nor needed. Many individual customer wishes could thus be satisfied with a single basic unit by simply combining the software modules, at the same time leaving open for the end user the option of a later expansion of functions. Furthermore, the end user remains involved in technical advances in that he need only update improved software components of an existing scope of function. Furthermore, the end user can subsequently add completely newly programmed functions.

In order for the end user to be able to review his selection and see whether it meets his needs, after selecting the various software modules for different functions of the car radio, the scope of functions of the car radio is simulated.

A PCMCIA card is preferably used as the external memory device. However, any other external memory medium having a corresponding interface with the car radio can also be used, such as a chip card, a money card, a key card, a personal computer (PC), a notebook or the like.

To appeal to a large group of customers and to facilitate selection of the scope of functions, the selection of the various software modules for different functions of the car radio and/or the simulation of the selected software package or the individual software modules is made available over the Internet, an Extranet, an Intranet, another computer network or on a data medium.

DETAILED DESCRIPTION

In the method according to the present invention, a car radio having suitable hardware for all the planned functions is first made available in the manner of a basic unit. A suitable microprocessor control contains the basic software as well as software modules for various functions of the car radio which can be loaded from the basic software by way of a card such as a chip card or a key card. The end user makes a retail purchase of the basic unit, which is not initially equipped with software modules, and selects from a number of available software modules those whose function or function feature he would like to use in his basic unit. These functions are selected by using a monitor, for example, and can also be tested immediately in a simulation until the end user is convinced that the selection he has made meets his wants and needs.

After a selection has been made, the software modules selected are copied to an external memory medium such as a card, and a purchase price is calculated based on the type and extent of the software modules selected. With this external memory medium, the end user then starts operation of his basic unit by connecting the memory medium to an interface in the basic unit and loading the software modules into the basic unit. Then the functions assigned to these software modules are available to the end user.

For implementation of copy protection, the software modules are preferably created on an individualized or device-specific basis on the end user's basic unit, i.e., the software modules recognize, e.g., on the basis of the serial number of the basic unit, whether they were purchased for this basic unit. They either cannot be loaded or cannot be activated on other basic units.

The end user can test and optionally also purchase other functions in the form of other software modules, e.g., by downloading them from the Internet, an Extranet, Intranet, another computer network or on the monitor at his retail dealer's.

In practice, the end user would purchase the car radio as a basic unit from a dealer, where he can select the desired functions in the form of software modules on a terminal for the unit he has selected. The end user may optionally also do this in advance online via the Internet. Operation of various functions is simulated at the terminal or on the Internet, thus making available an additional decision aid. It should be pointed out that the customer selects functions behind which are the corresponding software modules. After completing the selection, the end user receives an external memory device tailored to his needs, containing the software modules which stand behind the selected functions and have been stored or optionally created on a device-specific basis. This individual package of software modules yields a desired scope of operation and function after being loaded into the basic unit. Later the end user may simulate and select additional functions on the Internet or at a dealer's. If a decision is made to purchase, the additional software module is then transferred to his external memory device. As soon as the end user inserts the memory device thus expanded into his basic unit, the additional software module is loaded into the basic unit, and the corresponding function is then available. In addition, software modules that have already been purchased by the end user may also be updated on the memory device, so that the end user can enjoy the technical advances pertaining to his unit without having to purchase a new function. Updating software modules that have already been purchased may require payment of an additional fee.

Known means of payment transactions and individual software encryption, for example, are provided to make business transactions secure.

The operating software and the additional modules are stored in the car radio by using a PCMCIA card, for example, or some other external storage medium, or over a suitable interface with the car radio. Furthermore, such "fueling" of the car radio with the operating software and the additional modules and/or simulation of the software modules may optionally take place at the time of purchase of the car radio alternatively over networks such as the Internet, Extranet, other computer networks or data media.

What is claimed is:

1. A method for customer-individualized adjustment of a car radio having a microprocessor control and a corresponding internal operating software, the method comprising:

making a selection from a plurality of software modules for different functions of the car radio;

after making the selection, simulating a scope of functions of the car radio or a single one of the software modules;

storing the selected software modules on an external memory device;

connecting the external memory device to an interface in order to start operation of the car radio, the interface being adapted to change the internal operating software and to read the external memory device; and loading the selected software modules stored on the external memory device into the car radio as an extension of the internal operating software.

2. The method according to claim 1, further comprising providing the simulation over one of the Internet, an Extranet, an Intranet, another computer network, and a data medium.

3. The method according to claim 1, wherein the external memory device includes one of a PCMCIA card, a chip card, a money card, a key card, a personal computer, and a notebook.

4. The method according to claim 1, further comprising making available the selection of the software modules over the Internet.

* * * * *